United States Patent
Oddou et al.

(10) Patent No.: US 9,564,176 B2
(45) Date of Patent: *Feb. 7, 2017

(54) METHOD TO MARK AND EXPLOIT AT LEAST ONE SEQUENCE RECORD OF A VIDEO PRESENTATION

(71) Applicant: NAGRAVISION S.A., Cheseaux-sur-Lausanne (CH)

(72) Inventors: Christophe Oddou, Joinville le Pont (FR); Thierry Dagaeff, L'Isle (CH); Yousri Abdeljaoued, Ecublens (CH); Benoit Horisberger, Echichens (CH); Nicola Turini, Ardon (CH); Jean Rossier, Aubonne (CH); Alejandra Garcia Rojas Martinez, Clarmont (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,895

(22) Filed: Feb. 25, 2016

(65) Prior Publication Data

US 2016/0180889 A1 Jun. 23, 2016

Related U.S. Application Data

(63) Continuation of application No. 13/991,254, filed as application No. PCT/EP2011/071492 on Dec. 1, 2011, now Pat. No. 9,307,185.

(Continued)

(51) Int. Cl.
| | | |
|---|---|---|
| *H04N 5/91* | (2006.01) | |
| *G11B 27/10* | (2006.01) | |
| *G11B 27/32* | (2006.01) | |
| *H04N 21/472* | (2011.01) | |
| *H04N 21/835* | (2011.01) | |
| *G06F 17/30* | (2006.01) | |

(52) U.S. Cl.
CPC ......... *G11B 27/105* (2013.01); *G06F 17/3082* (2013.01); *G06F 17/30852* (2013.01);
(Continued)

(58) Field of Classification Search
None
See application file for complete search history.

(56) References Cited

U.S. PATENT DOCUMENTS

| 8,463,917 B2 | 6/2013 | Sugimoto et al. |
|---|---|---|
| 9,307,185 B2 * | 4/2016 | Oddou ................ G11B 27/105 |

(Continued)

FOREIGN PATENT DOCUMENTS

EP 1 596 594 11/2005

OTHER PUBLICATIONS

International Search Report issued in International Application No. PCT/EP2011/071492 dated Mar. 12, 2012.
(Continued)

*Primary Examiner* — Eileen Adams
(74) *Attorney, Agent, or Firm* — DLA Piper LLP (US)

(57) ABSTRACT

The present invention proposes a method to mark and exploit at least one sequence record of a video presentation played on a multimedia unit, said method comprising the steps of: during the video presentation, receiving a command from a user to mark a currently displayed video sequence, said command initiating the step of: creating a sequence record comprising a time index or frame index, allowing to locate the proper part of the video presentation, and a reference of the video presentation. At a later stage, requesting the edition of the sequence record by: adding textual information which corresponds to the actual sequence, and storing the sequence record.

18 Claims, 1 Drawing Sheet

Related U.S. Application Data

(60) Provisional application No. 61/418,925, filed on Dec. 2, 2010.

(52) U.S. Cl.
CPC ............ *G11B 27/322* (2013.01); *H04N 5/91* (2013.01); *H04N 21/47217* (2013.01); *H04N 21/835* (2013.01)

(56) References Cited

U.S. PATENT DOCUMENTS

| | | | |
|---|---|---|---|
| 2005/0013208 A1* | 1/2005 | Hirabayashi | G11B 27/034 369/27.01 |
| 2006/0098941 A1* | 5/2006 | Abe | G11B 27/031 386/279 |
| 2006/0161742 A1 | 7/2006 | Sugimoto et al. | |
| 2007/0050833 A1 | 3/2007 | Park | |
| 2007/0154190 A1 | 7/2007 | Gilley et al. | |
| 2008/0141299 A1* | 6/2008 | Eyer | H04N 21/235 725/32 |
| 2008/0313569 A1* | 12/2008 | Aoki | H04N 1/00387 715/838 |
| 2009/0202216 A1* | 8/2009 | Kaminski | H04N 5/76 386/353 |
| 2009/0210779 A1 | 8/2009 | Badoiu et al. | |

OTHER PUBLICATIONS

Written Opinion issued in International Application No. PCT/EP2011/071492 dated Mar. 12, 2012.

* cited by examiner

METHOD TO MARK AND EXPLOIT AT LEAST ONE SEQUENCE RECORD OF A VIDEO PRESENTATION

CROSS REFERENCE TO RELATED APPLICATIONS

This application is continuation of U.S. patent application Ser. No. 13/991,254 filed Jun. 3, 2013, which is a U.S. National Stage Application of International Application No. PCT/EP2011/071492 filed Dec. 1, 2011, which claims priority from U.S. Provisional Patent Application No. 61/418,925 filed Dec. 2, 2010. The entirety of all the above-listed applications are incorporated herein by reference

INTRODUCTION

The invention refers to a Television system engaging the TV viewer in an enhanced interaction with the video content. The invention further relies on a collaborative behaviour of TV viewers who actively participate in the annotation of video assets in order to provide information to future viewers.

Problem to be Solved

When watching a movie or any video sequence, one may want to annotate/tag a particular image or sequence of images at some point in the video.

The tag may be used as a bookmark to further jump from place to place along the video stream or it may be attached to an object (car, watch, tool . . . ), a person (actor, guest . . . ) or a geographical position or landscape that is recognized by the TV viewer because he is familiar with the place.

Such metadata attached to a video may be a personal tag which is kept private and used for subsequent viewings; alternatively, it may be shared with some friends or it may be public information which is shared with the whole community in order to provide valuable information to future viewers.

Unfortunately, this tagging activity may divert the attention of the viewer, especially when it is necessary to type some text with a remote control, a keyboard, a virtual keyboard, a smartphone, a tablet . . . .

One solution is to postpone this activity during an advertisement or simply at the end of the movie. Unfortunately, the TV viewer may have forgotten the visual context which has triggered the wish to tag the video, especially if the viewer wishes to submit multiple tags along the whole movie.

BRIEF DESCRIPTION OF THE INVENTION

The present invention proposes a method to exploit of at least one sequence record of a video presentation played on a multimedia unit, said method comprising the steps of:

during the video presentation, receiving a command from a user to mark a currently displayed video sequence, said command initiating the step of:

creating a sequence record comprising a time index or frame index, allowing to locate the proper part of the video presentation, and a reference of the video presentation, At a later stage, requesting the edition of the sequence record by:

adding textual information which corresponds to the actual sequence, storing the sequence record.

BRIEF DESCRIPTION OF THE DRAWINGS

The present invention will be better understood thanks to the attached drawings in which:

the FIG. 1 illustrates the system in which the invention can be implemented the FIG. 2 illustrates the method of the invention with the delayed annotation.

DETAILED DESCRIPTION

Figure 1:
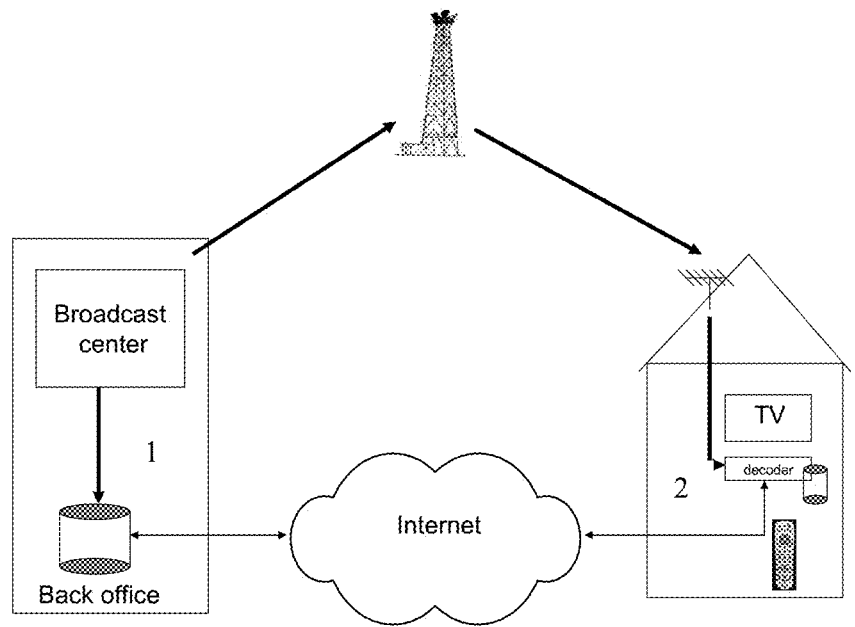

The FIG. 1 depicts the end-to-end system in the special case where the decoder is a PVR and the tagging point is defined with the remote control. In this configuration, the video samples are stored on the local hard disk until the TV viewer finalizes the annotation. The pre-tags may be stored locally but the finalized tag objects are uploaded to the back office server to be used by the whole community.

The FIG. 1 illustrates the system comprising a broadcaster 1 sending video presentations to at least one decoder 2. The video presentation comprises a reference allowing to identify one video presentation among the video presentations broadcasted by the broadcaster. In the illustrated embodiment, the decoder has an Internet connection to share its sequence records or to combine with sequence records from other users.

Figure 2:
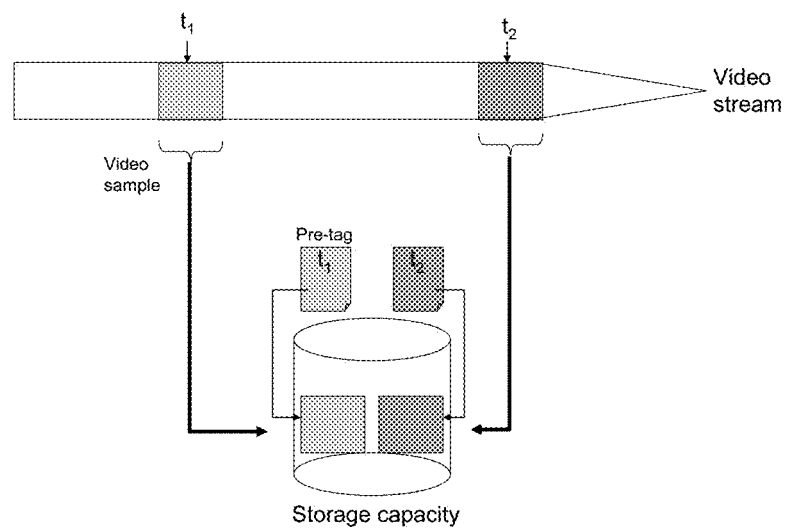

The FIG. 2 illustrate the method of the invention in which a video presentation or video stream is flagged at a time t1 or t2 corresponding to the time of the creation of the sequence record. At the end of the video presentation, the user can add additional data to annotate the sequence record.

Let's first define what a tag consists of. (A tag is equivalent as a sequence record)

A tag is made of at least:

the reference of the TV event or VoD movie to which it is attached.

a time index or frame index, allowing to locate the proper part of the TV event or VoD movie for example a word or a short sentence which corresponds to the actual annotation In addition the tag can alternatively further comprises:

a tag category (bookmark, object, person, location, . . . )

an identifier which uniquely identifies the originator of the tag (e.g. subscriber_id, pseudo, email address . . . )

a publication state indicating if the tag is a personal tag which is kept private or if it is shared with some friends or if it can be released to the whole community as public information.

The proposed solution for delayed tagging consists in first marking the video sequence when watching the video and then subsequently tagging the video sequence at a later time based on a video sample (or a set of still images) captured at marking time to remember the visual context.

Let's go through the various steps of the procedure.

Marking

When the user decides to tag a video at some point in time, he simply triggers the marking by either pressing a button of the remote control or a graphic button of an application running on a personal device like a tablet, a smartphone, a PC . . . .

This operation generates a pre-tag object which contains at least the following information:

the reference of the TV event or VoD movie to which it is attached.

a time index or frame index, an address pointer to a video sample (or a set of still images) around the marking time Further information can be attached to the pre-tag, i.e.:

the identifier of the originator

This pre-tag object may be stored temporarily in the decoder or uploaded to the back office for remote storage.

Simultaneously, a video sample (or a set of still images) is captured.

2 technical solutions are proposed to implement the acquisition of video samples around the marking time:

1—in a first embodiment, the decoder is a Personal Video Recorder equipped with a mass storage capacity like a Hard Disk and the TV viewer uses his remote control to mark a tagging point. In the decoder, a circular buffer of pre-defined size (corresponding to a few seconds) is continuously filled with the video stream. When the user places a mark, the buffer is further filled for half of its total size; then it is fetched and stored for subsequent viewing. The address pointer to the stored buffer is added in the pre-tag object for later access.

2—in a second embodiment, the decoder is not necessarily a PVR decoder and it has limited storage capacity. Therefore, the video sample is stored at the head-end based on a notification of the TV viewer who indicates a marking point. This notification can be made by the remote control through the decoder if it has a return path or from any portable device connected to the Internet like a PC, a tablet or a smartphone.

Several implementations are possible at the Head-End: a unique video sample may be copied for each TV viewer indicating a marking point; alternatively, to save memory, the start/end address pointers to a unique copy of the video asset are saved for further access (this option is typically applicable for a VoD service or a catch-up TV service for which the video file remains easily accessible in the Head-End once it has been broadcast).

Alternatively, in case of limited storage capacity or limited bandwidth on the broadband link, still images can be captured and stored every n frames rather than a video sample in order to further remember the context around the marking point.

The FIG. 2 depicts this pre-tagging step:

Tagging

When the user is available to finalize the tagging, he/she goes through the following steps:

he/she selects a tagging session in his/her list of tagging sessions he/she selects a pre-tag in his/her list of pre-tags he/she accesses the video sample captured at the related marking time in order to remember the visual context.

he/she enters the tag i.e. a word or a short sentence he/she optionally enters the tag category (bookmark, object, person, location . . . )

he/she defines the publication state.

At this point, the tag is finalized. The video sample is erased to free the memory, as well as the address pointer.

Publication

Once a tag is finalized, it is published according to its publication state. In most cases, it is simply uploaded in a back office server for subsequent usage. It can also be stored locally in the terminal, especially if it is a private tag.

In addition, it can be explicitly published to one or several persons using various communication systems such as emails, social networks (e.g. Facebook wall), SMS, micro-blogging (e.g. Twitter) . . . .

When all tags are stored in the back-office, it is important to record them efficiently in order to easily access them when requested. For example, all tags related to the same TV event/movie could be stored in a dedicated structure and ordered chronologically. More generally, an ontology could be used to structure the tag's database.

Tag Usage

Assuming a movie has been tagged by one or several persons, the goal is now to access the tags stored in the back office repository.

Several applications may be envisioned:

One option is to display all tags which have been associated to a movie by all contributors. This can be done in a graphical window of the TV screen or on a portable device (smartphone, tablet, PC . . . ) that the TV viewer may hold. Obviously, the system shall make sure that the tag is displayed at the right time according to the corresponding time stamp. Optionally, it may be possible to display the tag a few seconds ahead in order to warn the TV viewer in advance.

Alternatively, it may be possible to define some filters in order to display tags by category or by originator.

In a third option, it may be possible to use tags as bookmarks in order to jump from tag to tag in a video sequence; this feature allows TV viewers to access key positions in the video sequence. Regarding the implementation, the decoder uses the next tag time index received from the back office server in order to command the video server to jump to the specified location in the stream.

This invention is integrated as a software package into the decoder of the user. This decoder or multimedia unit comprises a program memory allowing to store program file and a processing device to execute this program. The decoder also comprises a memory in the form of a hard drive or any non volatile memory to at least store locally the sequence record while the video presentation is going on. The decoder can receive a command from a remote control via infrared or wireless means. The decoder is in charge of receiving the video presentation, usually in compressed form (via various means such as Internet, cable, antenna, satellite) and process the signal (i.e. decompress or decrypt it in case of conditional access video) and to pass it to the television. While the video signal is passed to the television, the decoder keeps track of an index of the video presentation, index that allows to identify the video sequence currently displayed. This could be in the form of a time index, a frame index or an index (e.g. packet index) that allows to retrieve later the video sequence during which the user has activated the tagging function.

A predefined time can be set by the system or as a parameter accessible by the user to move backward the video presentation and to store this index rather than the current index. The user can be interested to the few second prior to the time he has pressed the command to tag the video presentation. This predetermined time can be used to design the video buffer used to fetch a sample of the video presentation. In an exemplary embodiment, the predetermined time is 3 seconds, i.e. the decoder store at least 3 seconds of the video already displayed in case that the user request a tag.

In this case, the content of the buffer is stored in the hard drive of the decoder as past video event. It is possible that the following 3 seconds are also added to this sample, having the consequence that the 3 seconds before the user's command the 3 second after the user's command are store as video sample.

According to another embodiment, the video sample is added at the end of the video presentation, at the time the user enters into the mode of completing the sequence record by additional data.

In case that the video presentation is provided by a broadcast service that allows retrieval of video presentation at a later stage, the decoder does not need to buffer and store video sample at the time the user requests a tag. The video sample can be added later with a request sent to the broadcaster, this request containing at least the reference of the video presentation and the index. This step of adding the video sample can be executed after the user has sent the sequence record to the remote database. The latter can have access to the entire video presentation and can obtain the video sample for storing it with the other data of the sequence record.

What is claimed is:

1. A method for tagging a video presentation played on a multimedia unit with at least one sequence record, said method comprising the steps of:
   during the playing of the video presentation, receiving a command, at the multimedia unit, from a user to mark a currently displayed video sequence of the video presentation;
   creating, at the multimedia unit, a sequence record comprising a time index or frame index, and a reference of the video presentation, wherein the time index or frame index indicates a location of the marked portion of the video presentation;
   editing the sequence record of the video presentation that comprises the time index or frame index, wherein the editing of the sequence record of the video presentation occurs at the multimedia unit after completion of the playing of the video presentation and comprises:
      receiving from a user textual information which corresponds to the sequence record of the video presentation;
      adding the textual information received from the user to the sequence record; and
   storing the edited sequence record of the video presentation that contains the corresponding textual information received from the user.

2. The method of claim 1, wherein editing the sequence record further comprises:
   adding a tag category to identify the type of video sequence.

3. The method of claim 1, wherein the sequence record further comprises an identifier of the user, said identifier being obtained automatically from the multimedia unit or being introduced during the editing the sequence record.

4. The method of claim 1, wherein the sequence record comprises a publication state indicating if the record is:
   private;
   can be shared within a specific group; or
   publicly available.

5. The method of claim 1, wherein the sequence record comprises a video sample of the time corresponding to the index in the form of a still image or an video extract.

6. The method of claim 1, wherein editing the sequence record further comprises saving the sequence record to a remote database.

7. The method of claim 6, further comprising:
   requesting one or more of the sequence records stored in the remote database; and
   displaying to the user the sequence records.

8. The method of claim 7, wherein the display of the sequence records to the user is synchronized with the video presentation using the time index or frame index contained in the sequence record.

9. The method of claim 7, wherein the display of the sequence records to the user is synchronized in advance of time with the video presentation according to a predefined time.

10. A decoder for tagging a video presentation, said decoder comprising:
    a video decoder configured to decompress a compressed video stream and output the decompressed video stream to a display unit;
    a processing device configured to execute a program;
    a first memory to store at least the program;
    a second memory for storing non-executable data; and
    an input to receive a command from a user;
    wherein said decoder is configured to perform the following steps:
       during the playing of the video presentation, receiving a command from a user to mark a currently displayed video sequence of the video presentation;
       creating a sequence record comprising a time index or frame index and a reference of the video presentation, wherein the time index or frame index indicates a location of the marked portion of the video presentation;
       editing the sequence record of the video presentation that comprises the time index or frame index, wherein the editing of the sequence record of the video presentation occurs after completion of the playing of the video presentation and comprises:
          receiving textual information which corresponds to the edited sequence record of the video presentation from the user; and
          adding the textual information received from the user to the sequence record; and
       storing the edited sequence record of the video presentation that contains the corresponding textual information.

11. The decoder of claim 10, wherein editing the sequence record further comprises:
    adding a tag category to identify the type of video sequence.

12. The decoder of claim 10, wherein the sequence record further comprises an identifier of the user, said identifier being obtained automatically from the multimedia unit or being introduced during the editing the sequence record.

13. The decoder of claim 10, wherein the sequence record comprises a publication state indicating if the record is:
    private;
    can be shared within a specific group; or
    publicly available.

14. The decoder of claim 10, wherein the sequence record comprises a video sample of the time corresponding to the index in the form of a still image or an video extract.

15. The decoder of claim 10, wherein editing the sequence record further comprises saving the sequence record to a remote database.

16. The decoder of claim 15, further configured to perform the steps of:
   requesting one or more of the sequence records stored in the remote database; and
   displaying to the user the sequence records.

17. The decoder of claim 16, wherein the display of the sequence records to the user is synchronized with the video presentation using the time index or frame index contained in the sequence record.

18. The decoder of claim 16, wherein the display of the sequence records to the user is synchronized in advance of time with the video presentation according to a predefined time.

\* \* \* \* \*